(12) United States Patent
Boisjolie et al.

(10) Patent No.: US 7,716,472 B2
(45) Date of Patent: May 11, 2010

(54) METHOD AND SYSTEM FOR TRANSPARENT BRIDGING AND BI-DIRECTIONAL MANAGEMENT OF NETWORK DATA

(75) Inventors: Darren R. Boisjolie, Valparaiso, FL (US); Stephen P. Ashley, Gulf Breeze, FL (US); Gandhi Balasubramaniam, Shalimar, FL (US)

(73) Assignee: Bsecure Technologies, Inc., Fort Walton Beach, FL (US)

( * ) Notice: Subject to any disclaimer, the term of this patent is extended or adjusted under 35 U.S.C. 154(b) by 0 days.

(21) Appl. No.: 11/612,095

(22) Filed: Dec. 18, 2006

(65) Prior Publication Data

US 2007/0192593 A1  Aug. 16, 2007

Related U.S. Application Data

(60) Provisional application No. 60/754,954, filed on Dec. 29, 2005.

(51) Int. Cl.
    *H04L 29/06* (2006.01)
(52) U.S. Cl. ............... 713/162; 713/153; 713/170; 726/12; 726/21; 726/27; 709/245; 370/392
(58) Field of Classification Search .......... 713/162
    See application file for complete search history.

(56) References Cited

U.S. PATENT DOCUMENTS

| | | | |
|---|---|---|---|
| 4,794,594 A | 12/1988 | Picard | |
| 5,280,480 A | 1/1994 | Pitt et al. | |
| 5,309,437 A | 5/1994 | Perlman et al. | |
| 5,623,600 A | 4/1997 | Ji et al. | |
| 5,724,027 A | 3/1998 | Shipman et al. | |
| 5,734,824 A | 3/1998 | Choi | |
| 5,781,550 A | 7/1998 | Templin et al. | |
| 5,818,838 A | 10/1998 | Backes et al. | |
| 5,818,842 A | 10/1998 | Burwell et al. | |
| 5,825,772 A | 10/1998 | Dobbins et al. | |
| 5,911,043 A | 6/1999 | Duffy et al. | |
| 5,920,699 A | 7/1999 | Bare | |
| 5,987,457 A | 11/1999 | Ballard | |
| 6,012,088 A | 1/2000 | Li et al. | |
| 6,052,709 A | 4/2000 | Paul | |

(Continued)

FOREIGN PATENT DOCUMENTS

EP  1143660  10/2001

(Continued)

OTHER PUBLICATIONS

Cisco, "Mixed-Media Bridging", Cisco Systems, Internetworking Technologies Handbook, Jun. 1999.*

(Continued)

*Primary Examiner*—Matthew B Smithers
*Assistant Examiner*—Shewaye Gelagay
(74) *Attorney, Agent, or Firm*—Winstead PC (57) ABSTRACT

A network-communication method includes detecting network activity between a local area network and a wide area network, decoding the network activity, responsive to the decoding step, obtaining at least a source network address, and using the source network address to establish a transparent networking bridge between the local area network and the wide area network.

16 Claims, 5 Drawing Sheets

U.S. PATENT DOCUMENTS

| | | |
|---|---|---|
| 6,182,141 B1 | 1/2001 | Blum et al. |
| 6,189,008 B1 | 2/2001 | Easty et al. |
| 6,236,990 B1 | 5/2001 | Geller et al. |
| 6,266,664 B1 | 7/2001 | Russell-Falla et al. |
| 6,279,158 B1 | 8/2001 | Geile et al. |
| 6,321,267 B1 | 11/2001 | Donaldson |
| 6,385,653 B1 | 5/2002 | Sitaraman et al. |
| 6,490,290 B1 | 12/2002 | Zhang et al. |
| 6,519,571 B1 * | 2/2003 | Guheen et al. ............... 705/14 |
| 6,532,233 B1 | 3/2003 | Matsunaga et al. |
| 6,603,769 B1 * | 8/2003 | Thubert et al. ............... 370/401 |
| 6,618,353 B2 * | 9/2003 | Merrill et al. ............... 370/225 |
| 6,651,101 B1 | 11/2003 | Gai et al. |
| 6,675,162 B1 | 1/2004 | Russell-Falla et al. |
| 6,704,786 B1 | 3/2004 | Gupta et al. |
| 6,711,171 B1 | 3/2004 | Dobbins et al. |
| 6,748,416 B2 | 6/2004 | Carpenter et al. |
| 6,760,915 B2 | 7/2004 | deCarmo |
| 6,765,896 B1 | 7/2004 | Ahmed et al. |
| 6,772,214 B1 | 8/2004 | McClain et al. |
| 6,839,680 B1 | 1/2005 | Liu et al. |
| 6,859,834 B1 | 2/2005 | Arora et al. |
| 6,879,995 B1 | 4/2005 | Chinta et al. |
| 6,947,985 B2 | 9/2005 | Hegli et al. |
| 6,957,429 B1 | 10/2005 | Sekijima et al. |
| 6,978,461 B2 | 12/2005 | Shapiro et al. |
| 7,088,714 B2 * | 8/2006 | Athreya et al. ............... 370/389 |
| 7,089,246 B1 | 8/2006 | O'Laughlen |
| 7,206,814 B2 | 4/2007 | Kirsch |
| 7,222,157 B1 | 5/2007 | Sutton, Jr. et al. |
| 7,231,381 B2 | 6/2007 | Li et al. |
| 7,231,392 B2 | 6/2007 | Ro |
| 7,272,842 B2 | 9/2007 | Kay et al. |
| 7,343,390 B2 | 3/2008 | Cohen et al. |
| 7,359,935 B1 | 4/2008 | Karipides et al. |
| 7,444,403 B1 | 10/2008 | Packer et al. |
| 7,472,163 B1 | 12/2008 | Ben-Yoseph et al. |
| 2001/0047290 A1 | 11/2001 | Petras et al. |
| 2002/0015403 A1 | 2/2002 | McConnell et al. |
| 2002/0042845 A1 | 4/2002 | Burmann et al. |
| 2002/0059429 A1 | 5/2002 | Carpenter |
| 2002/0103914 A1 | 8/2002 | Dutta et al. |
| 2002/0144275 A1 | 10/2002 | Kay et al. |
| 2002/0150080 A1 | 10/2002 | Bhattacharya et al. |
| 2002/0178381 A1 | 11/2002 | Lee et al. |
| 2002/0186692 A1 | 12/2002 | Chang et al. |
| 2002/0199194 A1 | 12/2002 | Ali |
| 2003/0009495 A1 | 1/2003 | Adjaoute |
| 2003/0041118 A1 | 2/2003 | Elnozahy et al. |
| 2003/0051170 A1 | 3/2003 | Spearman |
| 2003/0074466 A1 | 4/2003 | Hughes et al. |
| 2003/0084184 A1 | 5/2003 | Eggleston et al. |
| 2003/0096605 A1 | 5/2003 | Schlieben et al. |
| 2003/0110272 A1 | 6/2003 | du Castel et al. |
| 2003/0112767 A1 | 6/2003 | Meier |
| 2003/0123465 A1 | 7/2003 | Donahue |
| 2003/0149755 A1 | 8/2003 | Sadot |
| 2003/0229809 A1 | 12/2003 | Wexler et al. |
| 2004/0024688 A1 | 2/2004 | Bi et al. |
| 2004/0032393 A1 | 2/2004 | Brandenberg et al. |
| 2004/0083448 A1 | 4/2004 | Schulz et al. |
| 2004/0103434 A1 | 5/2004 | Ellis |
| 2004/0139338 A1 | 7/2004 | Ohmori et al. |
| 2004/0160903 A1 | 8/2004 | Gai et al. |
| 2004/0172529 A1 | 9/2004 | Culbert |
| 2004/0177247 A1 | 9/2004 | Peles |
| 2004/0187089 A1 | 9/2004 | Schulz |
| 2004/0243680 A1 | 12/2004 | Mayer |
| 2004/0258071 A1 | 12/2004 | Thomas et al. |
| 2005/0010659 A1 | 1/2005 | Gonguet et al. |
| 2005/0010668 A1 | 1/2005 | Chen |
| 2005/0010877 A1 | 1/2005 | Udler |
| 2005/0053001 A1 * | 3/2005 | Jones et al. ............... 370/235 |
| 2005/0102274 A1 | 5/2005 | Chen |
| 2005/0108227 A1 | 5/2005 | Russell-Falla et al. |
| 2006/0184998 A1 | 8/2006 | Smith et al. |
| 2006/0236095 A1 | 10/2006 | Smith et al. |
| 2007/0192593 A1 | 8/2007 | Boisjolie et al. |
| 2007/0199066 A1 | 8/2007 | Smith et al. |

FOREIGN PATENT DOCUMENTS

| | | |
|---|---|---|
| EP | 1143661 | 10/2001 |
| EP | 1143662 | 10/2001 |
| EP | 1143663 | 10/2001 |
| EP | 1143664 | 10/2001 |
| EP | 1143665 | 10/2001 |
| EP | 1143681 | 10/2001 |
| JP | 2002/077242 | 3/2002 |
| JP | 2003/069631 | 3/2003 |
| WO | WO-97/18637 | 5/1997 |
| WO | WO-00/35130 | 6/2000 |
| WO | WO-00/78004 | 12/2000 |
| WO | WO-02/15491 | 2/2002 |
| WO | WO-2004/028082 | 4/2004 |
| WO | WO-2004/075509 | 9/2004 |
| WO | WO-2004/098109 | 11/2004 |

OTHER PUBLICATIONS http://www.erg.abdn.ac.uk/users/gorry/course/inet-pages/arp.html; Address Resolution Protocol (arp), Jan. 1, 2001, 3 pages.

U.S. Appl. No. 10/766,563, Boisjolie et al.

Cisco Systems Inc, "Transparent Bridging", Internetworking Technologies Handbook, Feb. 2002, (7 pages).

Cisco Systems Inc, "Mixed-Media Bridging", Internetworking Technologies Handbook, Jun. 1999, (6 pages).

* cited by examiner

METHOD AND SYSTEM FOR TRANSPARENT BRIDGING AND BI-DIRECTIONAL MANAGEMENT OF NETWORK DATA

CROSS-REFERENCE TO RELATED APPLICATIONS

This patent application claims priority from, and incorporates by reference the entire disclosure of, U.S. Provisional Patent Application No. 60/754,954, filed Dec. 29, 2005. This patent application incorporates by reference the entire disclosure of U.S. patent application Ser. No. 10/766,563, filed Jan. 26, 2004.

BACKGROUND OF THE INVENTION

1. Technical Field

The present invention relates generally to the field of service provisioning in a network and, more particularly, but not by way of limitation, to a method of and system for transparent bridging and bi-directional management of network data.

2. History of Related Art

Individual users connect every day to computer networks for the purpose of utilizing services that the networks provide. As the Internet grows and evolves, more and more users access networks and the services provided by these networks. Such services include access privileges, which permit access to servers that provide different resources, including security services that aim to protect users from malicious attacks.

Even though all users face the same Internet threats that large businesses face, many individual users do not understand and cannot afford high-priced blended-threat solutions designed for businesses. Most devices that aim to prevent Internet threats are expensive. For example, when a personal computer (PC) is infected, a separate client application is required to remove the infected files. With most PC security solutions, users are forced to install a separate piece of extensive-client security technology for each type of security threat. Typical extensive-client security technology requires large and separate file setups for each application. Installed individually on each PC, the extensive-client security technology often presents a confusing and expensive array of software applications that may conflict with other PC applications. Therefore, there is a need for a method and system for an affordable, comprehensive, network security service.

SUMMARY OF THE INVENTION

A network-communication method includes detecting network activity between a local area network and a wide area network, decoding the network activity, responsive to the decoding step, obtaining at least a source network address, and using the source network address to establish a transparent networking bridge between the local area network and the wide area network.

A data-traffic security method includes receiving a transmission-control-protocol (TCP) synchronize (SYN) data packet. A tag of a TCP header of the TCP SYN data packet includes information about at least one of a client, application, connection, and user. The method includes evaluating the information to determine whether security measures should be undertaken.

An article of manufacture for network communication includes at least one computer readable medium and processor instructions contained on the at least one computer readable medium. The processor instructions are configured to be readable from the at least one computer readable medium by at least one processor and thereby cause the at least one processor to operate as to detect network activity between a local area network and a wide area network, decode the network activity, responsive to the decoding step, obtain at least a source network address, and use the source network address to establish a transparent networking bridge between the local area network and the wide area network.

An article of manufacture for data-traffic security includes at least one computer readable medium and processor instructions contained on the at least one computer readable medium. The processor instructions are configured to be readable from the at least one computer readable medium by at least one processor and thereby cause the at least one processor to operate as to receive a transmission-control-protocol (TCP) synchronize (SYN) data packet. A tag of a TCP header of the TCP SYN data packet includes information about at least one of a client, application, connection, and user. The processor instructions are configured to be readable from the at least one computer readable medium by at least one processor and thereby cause the at least one processor to operate as to evaluate the information to determine whether security measures should be undertaken.

A service-delivery system includes a computer layer adapted to provide local protection of data on at least one client on the computer layer, a device layer interoperably connected to the computer layer and adapted to protect the at least one client against at least one threat, and a web service layer interoperably connected to the device layer and adapted manage network security for the at least one client. The computer layer is adapted to communicate on at least a periodic basis with the device layer and the web services layer.

BRIEF DESCRIPTION OF THE DRAWINGS

A more complete understanding of the present invention may be obtained by reference to the following Detailed Description of Illustrative Embodiments of the Invention, when taken in conjunction with the accompanying Drawings, wherein.

DETAILED DESCRIPTION OF ILLUSTRATIVE EMBODIMENTS OF THE INVENTION

Various embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

A computer network may be simply defined as a collection of computers connected together to permit sharing of hardware or software resources and to increase overall reliability. The term local area network (LAN) is usually applied to computer networks in which the computers are located in a single building or in nearby buildings, such as, for example, on a college campus or at a single corporate site. When the computers are further apart, the term wide area network (WAN) is typically used. The Internet may properly be referred to as a WAN.

Various embodiments of the invention utilize a security device to initiate and establish a connection between a LAN and a WAN despite the fact that the security device does not have any identifiable network presence (i.e., no IP or MAC address specifically assigned to the security device). The security device imitates a local presence on the WAN. It is this capability that allows the security device to initiate and establish a connection to various backend servers on the WAN to make determination(s) on processed data.

Various embodiments also permit the control of specific client-based applications by identifying client-initiated data unique, for example, to an application, a user, and a connection. In contrast, many current bridge devices cannot determine data origin, data type, data connection, or data-originating user. Various embodiments of the invention employ a client-to-gateway communication technique that uses tagged TCP packets on new connections to identify details about the client device, the user, the application, and the connection from which the data came. By reading this tagged information at the security device, specific user-defined security services can be performed from the WAN side of the security device.

Figure 1:
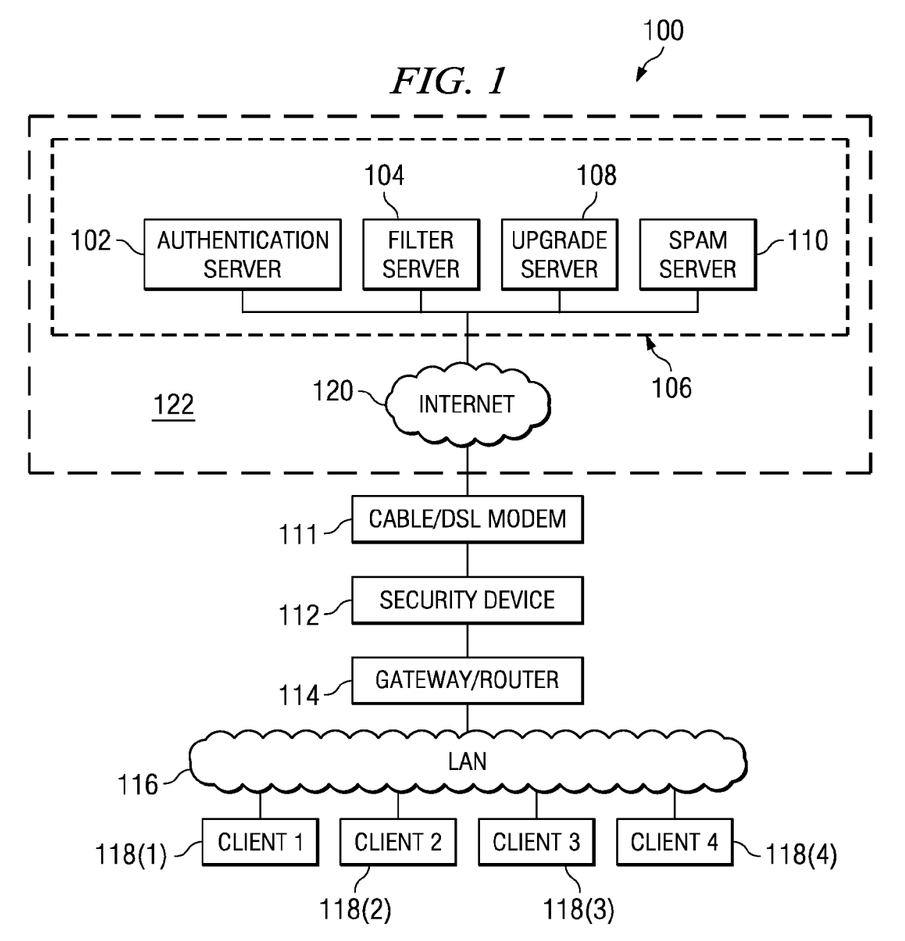
FIG. 1 is a block diagram of a system in which a local area network (LAN) is coupled to a wide area network (WAN) via a router, a security device, and a modem.

FIG. 1 illustrates a network 100. As shown in FIG. 1, a LAN 116 is connected to a WAN 122 via a gateway/router device 114, a security device 112, and a modem 111. The modem 111 may be, for example, a cable or DSL modem. The gateway/router device 114 functions as an interface in transferring data packets between devices on the LAN 116 and the WAN 122. As illustrated in FIG. 1, the WAN 122 includes the Internet 120 and provisioning services 106 including a plurality of servers 102, 104, 108, and 110. In particular, the servers 102, 104, 108, and 110 illustrated are an authentication server 102, a filter server 104, an upgrade server 108, and a Spam server 110. Those having skill in the art will appreciate that functionality described relative to the servers 102, 104, 108, and 110 may be implemented separately or on one or more servers without departing from principles of the invention. The authentication server 102 is responsible for ensuring that the security device 112 is authorized to access other servers such as, for example, the servers 104-110 on the WAN 122. The authentication server 102 also provides information to the security device 112 as to how the security device 112 can obtain access to other servers, such as, for example, the servers 104-110 if the security device 112 is not registered and also provides policy information to the security device 112 if the security device 112 is registered. The filter server 104 responds to uniform resource locator (URL) queries from the security device 112. Depending on the type of information requested of the filter server 104, the filter server responds with appropriate categorization of a URL in question. The filter server 104 may also provide for logging of queries for later review.

The upgrade server 108 provides access including, but not necessarily limited to, new versions of firmware for the security device 112, new thin-client software, and new virus and/or spyware/malware definition information. The Spam server 110 responds to mail domain queries from the security device 112. The Spam server 110 accesses local and/or remote databases of known mail domains and/or IP addresses from which Spam originates in order to determine whether the mail domain in the query is from a known Spam mail domain or IP address. Other services that may be provided via one or more of the servers 102, 104, 108, and 110 include, but are not necessarily limited to, backup services (both online and local to a device or LAN), wireless access management, file sharing across LAN devices, and multi-media management services.

Each of a plurality of client devices 118(1)-(4) of the LAN 116 has a LAN network address such as, for example, an Ethernet address. Each Ethernet address identifies a physical address (e.g., media access control (MAC) address) of the respective client devices 118(1)-(4) on the LAN 116. A MAC address is a unique identifier attached to most devices on a network.

Each of the client devices 118(1)-(4) also has an IP address associated with the location of the client device 118(1). An IP address is a unique number that devices use in order to identify and communicate with each other on a network utilizing the Internet Protocol standard. Any participating device must have its own unique address. This allows information passed onwards on behalf of a sender to indicate where to send the information next and for a receiver of the information to know that the receiver is the intended destination.

As shown in FIG. 1, the security device 112 is positioned between the gateway/router device 114 and the modem 111. More specifically, the security device 112 is interposed serially on the WAN side of the gateway/router device 114 between the gateway/router device 114 and the modem 111. The security device 112 can be installed transparently between the gateway/router device 114 and the modem 111 without reprogramming any other devices on the WAN 122 or the LAN 116. The security device 112 is thus transparent (i.e., unknown) to each of the plurality of client devices 118(1)-(4) on the LAN 116.

The security device 112 serves to: 1) provide a method for packet identification of network data for bi-directional traffic management; and 2) enable various security processes to be performed for the client devices 118(1)-(4). The security processes may include, for example, packet filtering, application control, Spam filtering, content monitoring, anti-virus solutions, and the like. The security device 112 thus serves to protect the client devices 118(1)-(4), each of which can be, for example, a client PC (e.g., operating Windows XP, Mac OSX, or Linux), a gaming console, a media streaming box, or any device with Internet connectivity. The security device 112 is adapted to communicate with the servers 102, 104, 108, and 110 located on the WAN 122 without the security device 112 having a directly-identifiable network presence on the WAN 122.

The security device 112 is adapted to perform multiple security functions using a remotely-hosted control center, which can be resident, for example, on one or more of the servers 102, 104, 108, and 110. The remotely-hosted control center eliminates a need for users to choose from a variety of client-based stand-alone security products such as, for example, firewall protection, anti-virus protection, pop-up cessation, activity reporting, content filtering, and Spam filtering.

Figure 2:
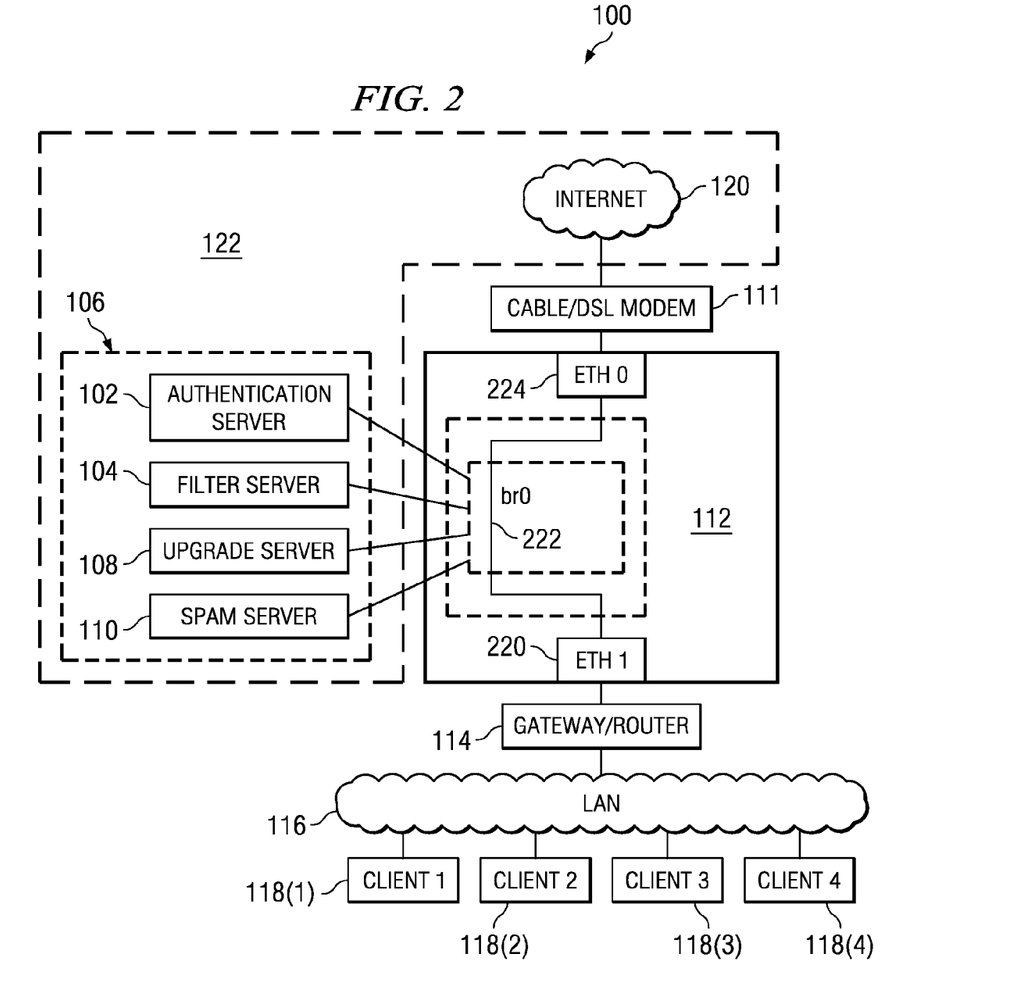
FIG. 2 is a block diagram of a system in which a LAN is coupled to a WAN, illustrating in detail the security device.

FIG. 2 illustrates the network 100, operational details of the security device 112 being further illustrated. As discussed above with respect to FIG. 1, the security device 112 can be installed transparently in the path between the gateway/router device 114 and the modem 111 without reprogramming any other devices on the LAN 116 or the WAN 122. The security device 112 is transparent (i.e., unknown) to each of the client devices 118(1)-(4) on the LAN 116. As illustrated, the security device 112 is able to create a transparent networking bridge br0 222 coupling a LAN interface eth1 220 to a WAN interface eth0 224.

In a typical embodiment, the gateway/router 114 operates on the OSI network layer and makes use of a thirty-two-bit IP address. The IP address includes a unique network identifier and a host identifier. Routers typically have an identifiable network IP presence and make use of a destination network identifier to determine an optimal path between a source network (e.g. the LAN 116) to a destination network (e.g., the WAN 122). In contrast to routers, bridges (e.g., the networking bridge br0 222) typically operate on the OSI data link layer and are effectively transparent to client devices such as, for example, the client devices 118(1)-(4). Therefore, the transparent networking br0 bridge 222 coupling the LAN interface eth1 220 and the WAN interface eth0 224 has no IP address associated therewith.

Since the transparent networking bridge br0 222 has no identifiable IP presence, unless further measures are undertaken, the security device 112 cannot create a connection from a source network to a destination network (i.e., between a device on the LAN 116 and a device on the WAN 122). In order to allow the security device 112 to create a connection, for example, with the servers 102, 104, 108, or 110, an IP address is assigned to the transparent networking bridge br0 222, as discussed in more detail below. The assigned IP address is in the same range as the IP address assigned to the gateway/router device 114 and allows the security device 112 to create a connection, for example, with any of the servers 102, 104, 108, and 110 within the provisioning services 106.

In a typical embodiment, the security device 112 communicates with the servers 102, 104, 108, and 110 without having a directly-identifiable network presence on the WAN 122. The security device 112 initializes its configuration by sniffing (i.e., detecting) outbound network activity from the LAN 116 (e.g., from one of the client devices 118(1)-(4)). The security device 112 decodes the detected outbound network activity and obtains the IP address of the source (i.e., of the gateway/router device 114) and the MAC address of a first gateway on the WAN 122 (not explicitly shown) used to send outgoing data packets such as, for example, a switch of an Internet Service Provider (ISP) to which users of the client devices 118(1)-(4) subscribe.

The security device 112 may also detect a dynamically-assigned IP address of the first gateway of the WAN 122, for example, by sniffing a DHCP offer packet or a DHCP request packet. As another option, the security device 112 itself may create a DHCP offer packet itself that appears to have come from the gateway/router device 114 and then sniff a responsive DHCP request packet to obtain the IP address of the first gateway of the WAN 122. In contrast, if the IP address of the first gateway of the WAN 122 is statically assigned, a user may manually enter it at one of the client devices 118(1)-(4) for communication to the security device 112. Those having skill in the art will appreciate that the security device 112 needs the IP address of the first gateway of the WAN 122 so that outbound data packets have the proper source IP address in their headers and so that proper processing of data packets can occur.

Following initialization, the security device 112 establishes the networking bridge br0 222 as a transparent bridge between the LAN interface eth0 220 and the WAN interface eth1 224 by assigning to the security device 112 an IP address having a same IP range as the captured IP address assigned to a WAN connection of the gateway/router device 114.

After the networking bridge br0 222 has been established, the security device 112 may establish communications with devices on the WAN 122, such as the servers 102, 104, 108, and 110. The security device 112 may, for example, communicate with the authentication server 102 to determine if there is an existing account already set up for the security device 112. If an account already exists, the authentication server 102 responds to an inquiry by the security device 112 with corresponding account policy information. If not, the authentication server 102 provides information to allow a user to create a new account.

During subsequent communications with the authentication server 102, the security device may be configured to determine whether an update to the account information on the authentication server 102 has occurred. If there is no change, the security device 112 uses already-stored account information rather than wasting bandwidth updating unchanged information.

When the security device first attempts to communicate with the authentication server 102, it uses the first gateway on the WAN 122 (not explicitly shown). The first gateway on the WAN 122 does not recognize the IP address entry of the authentication server 102, but recognizes the MAC address of the first gateway of the WAN 122 as its own. The first gateway on the WAN 122 therefore sends received data packets intended for the authentication server 102 upstream toward their intended destination. All original outgoing data is sent upstream using its original packet structure. After the security device 112 has initialized and been configured, the security device 112 may in some embodiments evaluate all incoming and outgoing data for secure processing.

As another option, only some data packets are evaluated in order to conserve bandwidth and memory resources, as described in more detail below. In a typical embodiment, when a TCP connection is initiated, an initiating system sends a first data packet, referred to as a SYN packet, that includes a TCP header with a SYN flag set. A system that receives the SYN packet sends back a response packet that has the SYN and acknowledge (ACK) flags set. In response, the initiating system sends an ACK and the connection is considered established. The three packets necessary for considering a TCP connection to have been established are often collectively referred to as the three-way handshake.

A local client application on the client devices 118(1)-(4) may be adapted to include data about the client, connection, application, user, and the like in a tag in a TCP header of the SYN packet, responsive to establishment of the new connection. In addition, once the connection is established, the security device 112 may be adapted to add the new connection to a table of current connections. In similar fashion, for every new TCP connection from the LAN 116, the security device 112 parses TCP header information of the SYN packet for a tag. Details of the TCP header option are discussed further below with respect to FIG. 4.

If no traffic is detected on the connection for a predetermined time period, information regarding the connection is dropped by the security device 112 in order to save memory resources. This loss of information by the security device 112 must be compensated for because a TCP connection can often remain idle for much longer than the predetermined time period. Therefore, the local client application on the client device 118 also has a timer; if the client device 118 does not detect data on the connection for a predetermined time period, when the client device 118 sends out the next packet, the client device 118 inserts a zero-length PSH/ACK packet with a tag in the TCP header options that the security device 112 can use to reinstate information regarding the connection, client, application, user, and the like. The timed-out connection thus appears to the security device 112 to be a new connection. Once the security device 112 detects the data in the extra PSH/ACK packet, the security device 112 can evaluate data packets sent via the connection (e.g., to determine whether to block or not). Thus, the security device 112 does not need to re-evaluate the type of connection (e.g., http) before evaluating the data packets on the connection, for example, for purposes of blocking or filtering.

Thereafter, the local client application detects outgoing network data and determines the source of the data. The local client application injects outgoing data packets with an application identification code. The security device 112 parses the outgoing data packets that pass through the LAN interface eth1 220 to determine various information regarding the data packets such as, for example, a data origination point, policy being used, and type of data being processed. The security device 112 analyzes the data packets and communicates to an appropriate server (e.g., the filter server 104) to provide appropriate service(s).

Figure 3:
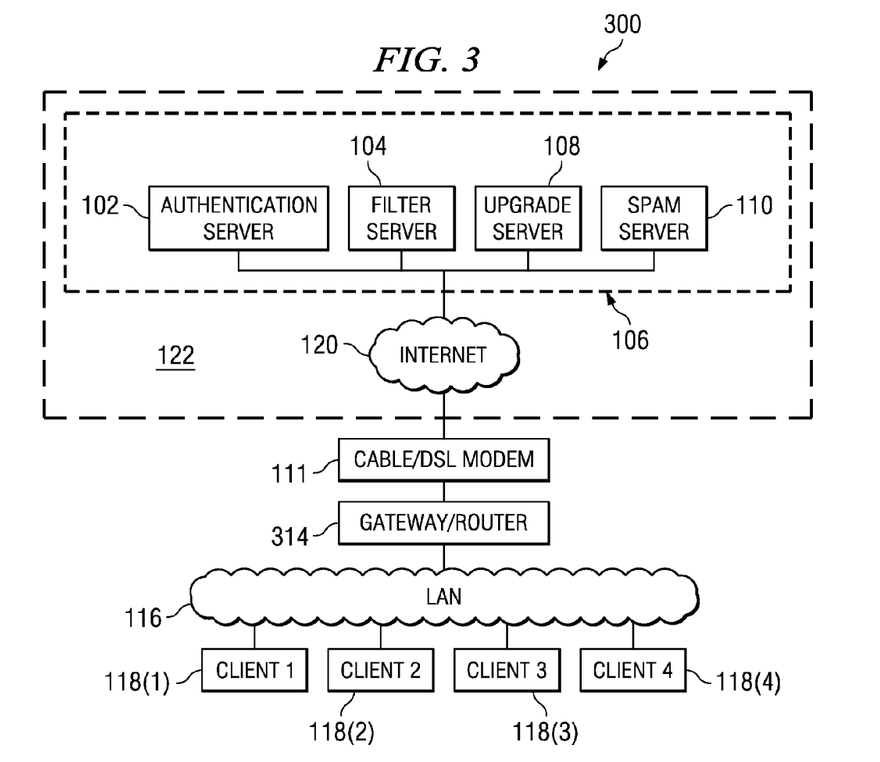
FIG. 3 is a block diagram of a system in which a LAN is coupled to a WAN via a router and a modem.

FIG. 3 illustrates a system 300 in which the LAN 116 is connected to the WAN 122 via a gateway/router device 314 and the modem 111. In FIG. 3, the gateway/router device 314 is adapted to include the service-provision functionality of the security device 112 as well as the functionality of the gateway/router 114. The gateway/router device 314 may be used, for example, to block viruses, network attacks, malicious code, hacker exploits, hybrid threats, and Spam, and to perform content filtering. The gateway/router device 314 is adapted to perform multiple security functions using a remotely-hosted control center (e.g., hosted on one or more of the servers 102, 104, 108, and 110 of the provisioning services 106). The remotely-hosted control center eliminates a need for users to choose from a variety of PC-based stand-alone security products such as, for example, firewalls, anti-virus, pop-up killers, activity reporting, content filtering, and anti-Spam products. Unlike the embodiment shown in FIGS. 1-2, there is typically no need for transparent bridging because the gateway/router device 314 has an identifiable IP presence on the WAN 122.

In a typical embodiment of the gateway/router device 314, network address translation (NAT) occurs in order for the gateway/router device 314 to serve the plurality of client devices 118(1)-(4). NAT is a technique in which source and destination addresses of IP packets are rewritten as they pass through a router or firewall. NAT is most commonly used to enable a plurality of hosts on a private network (e.g., the LAN 116) to access the Internet (e.g., the WAN 122) using a single public IP address.

When the gateway/router 314 has only a single IP address, but serves the plurality of client devices 118(1)-(4), the gateway/router device 314 performs NAT so that, to an ISP receiving packets from the gateway/router device 314, there appears to be only one client device. In similar fashion, inbound data packets to the client devices 118(1)-(4) are decoded by the gateway/router device 314 to be sent to the respective client device of the client devices 118(1)-(4).

The gateway/router device 314 utilizes the NAT functionality so that, responsive to receipt of a tagged data packet, the tagged data packet is evaluated to determine whether security measures such as, for example, whether to filter or not should be undertaken. In a typical embodiment, the gateway/router device utilizes a TCP header tag of a SYN packet as discussed above relative to the security device 112. Once the determination has been made regarding security measures to be taken, NAT functionality proceeds in a conventional manner. Operation of the servers 102, 104, 108, and 110 when the gateway/router device 314 is used is substantially the same as when the security device 112 is used as described above.

When the gateway/router 314 is used, typically only the initial SYN packet is tagged. However, the gateway/router device 314 does not typically suffer from the problem of using connection information before the connection is actually broken. To be able to perform NAT operations, a typical embodiment of the gateway/router device 314 keeps information about the connection until the connection has actually been broken. Security service information is kept associated with information of the gateway/router device 314 for each TCP connection; as such, there is typically no need for an additional zero-length PSH/ACK packets as in the case of the security device 112.

Figure 4:
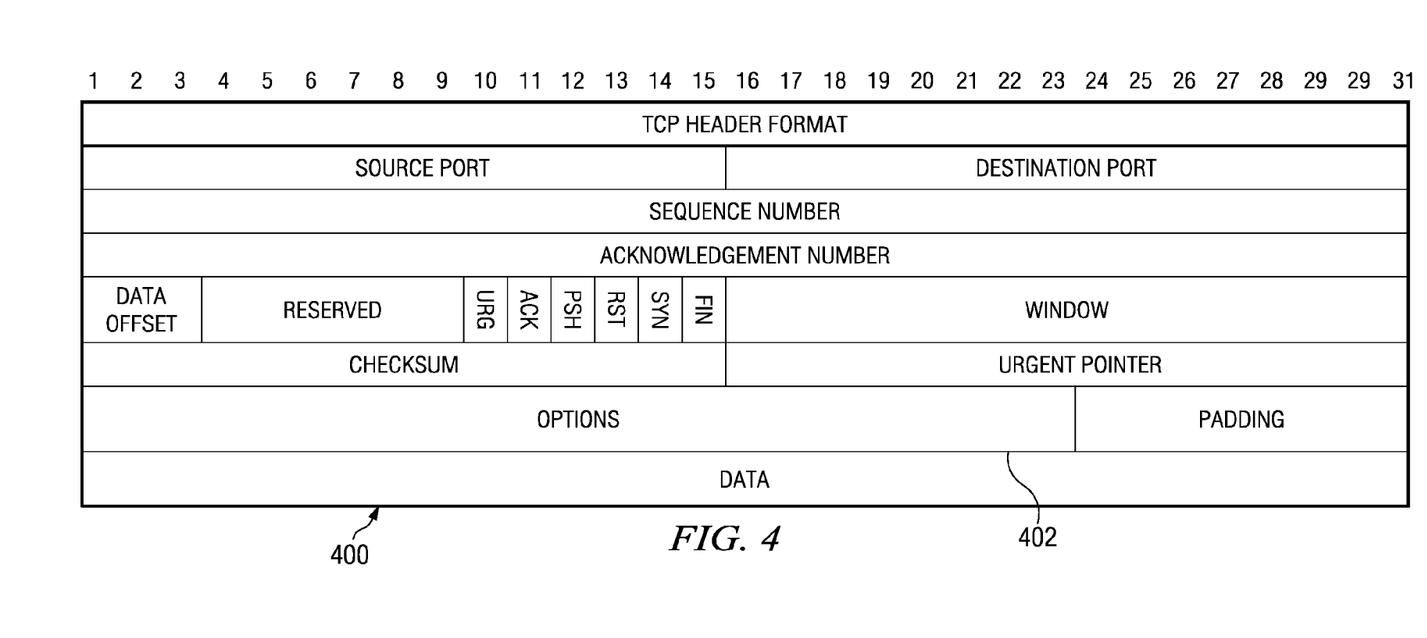
FIG. 4 illustrates a TCP header.

FIG. 4 illustrates the format of a TCP header 400. An options field 402 of the TCP header 400 includes tag data injected by a local client application as discussed above. The options field 402 may include one or more options. In a typical embodiment of the invention, Option 19 for MD5 encryption is the TCP header option used. Option 19 is suitable for tag data as it is not typically blocked as malformed data by firewall systems. Option 19 is an eighteen-byte option.

Option 19 is typically used because it is allowed data in standard Internet protocols; therefore, tag data can be inserted in Option 19 of the TCP header 400 in a way that the tag data will pass through one or more network devices until the tag data is received by the security device 112 without conflicting with applications that may use other packet data. The thin-client application running on the client devices 118 may insert, for example, application code, a profile ID, and checksum information in the TCP header.

If another application uses the MD5 encryption option (i.e., as opposed to having local client-application tag data stored therein), the local client application inserts an additional Option 19 into the TCP header 400. Upon receipt of the data packet, the security device 112 or gateway/router device 314 reads the Option 19 containing the tag data (upon verifying a corresponding checksum) and does nothing with the other Option 19 other than pass it along unchanged to the next device. Following reading of the tag data, the security device 112 or the gateway/router device 314 strips the Option 19 containing the tag data and sends the data packet to the next device, regardless of whether another Option 19 is present. If necessary, the security device 112 or the gateway/router device 314 replaces the tag data with null data to ensure that the data packet stays the same size.

An architecture in accordance with principles of the invention provides multiple layers of protection to users with internet access. The architecture is, in a typical embodiment, a combination of network-based systems and software that communicate on a frequent basis with local network devices and client-based software. The three layers may be characterized as follows: 1) a web services layer; 2) a device layer; and 3) a computer layer. The three layers together provide various protections against internet threats, serve to detect and stop threats at different entry points, and utilize various methods and techniques to prevent internet-based attacks from succeeding.

Figure 5:
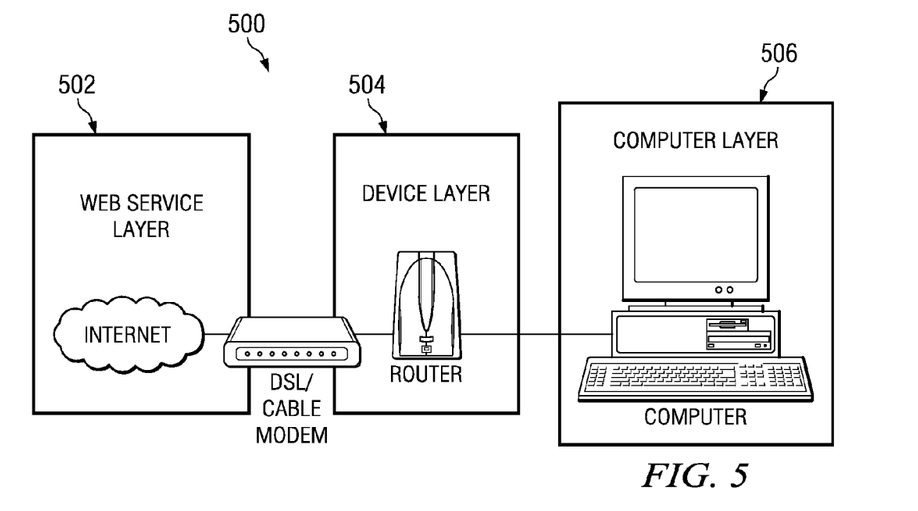
FIG. 5 illustrates a three-layer protection architecture in accordance with principles of the invention.

FIG. 5 illustrates a three-layer protection architecture in accordance with principles of the invention. In FIG. 5, an architecture 500 includes a web service layer 502, a device layer 504, and a computer layer 506. The web services layer 502 is, in a typical embodiment, a combination of systems, software, processes and data that manage network security services on a frequent, if not virtually-continuous or continuous, basis. The web services layer 502 provides updated information on emerging threats, content classifications, virus/spyware definitions, phishing threats, Spam sources, and service updates to ensure users are being protected with updated resources.

The web service layer 502 serves to centrally manage network security for one or more clients (e.g., the clients 118). In a typical embodiment, the web service layer 502 performs real-time updates and is accessible via a simple web-browser interface. The web service layer 502 is connected to a router (e.g., the gateway/router 314) via a cable/DSL modem (e.g., the cable/DSL modem 111). The web service layer 502 may operate in a plurality of different ways. For example, the web service layer 502 may perform realtime analysis of data, such as, for example, by analyzing packet headers or an entire packet for Spam blocking or blocking of objectionable web content.

The device layer 504, which is resident on the router, is, in a typical embodiment, a hardware-based system that provides comprehensive network protection that stops internet-based threats before they can reach the computer layer 506. The device layer 504 provides, in a typical embodiment, firmware-based services that are used to block, evaluate, and protect against internet-based threats and against unwanted use of applications and the internet by local network-based users. The device layer 504 communicates with the web services layer 502, which may include, for example, servers such as the servers 102-110, and applications resident on the computer layer 506, in order to provide up-to-date protection. The device layer 504 evaluates and analyzes data as the data passes through the device layer 504 (e.g., via the gateway/router 114) in either direction. The data passing through the device layer 504 is, in a typical embodiment, filtered for outgoing personal information and for requests for inappropriate internet content either from web-based information or through a direct peer-to-peer connection (i.e., P2P or instant-messaging applications).

Connected to the router on the device layer 504 is a computer (e.g., one of the clients 118). The computer layer 506 is resident on the computer and serves to provide integrated virus and spyware protection, as well as protection against so-called blended threats. For purposes of this patent application, a blended threat is defined as a computer network attack that seeks to maximize the severity of damage and speed of contagion by combining methods, for example, using characteristics of both viruses and worms, while also taking advantage of vulnerabilities in computers, networks, or other physical systems. An example of a blended threat would be an attack in which a virus is sent to via an e-mail attachment along with a Trojan horse embedded in an HTML file that will cause damage to a receiving computer. NIMDA, Code Red, and Bugbear are examples of blended threats.

The computer layer 506 can be used to provide computer-based services (e.g., Windows, Linux, or Mac), or mobile-client-based services (e.g., a cell phone or personal digital assistant). The computer layer 506, in a typical embodiment, communicates periodically on a virtually-continuous basis with both the device layer 504 and the web services layer 502 to provide up-to-date protection against various threats. Client-based services implemented via the computer layer 506 provide local protection of data stored on disks, transferred in downloads, and through other read/write media. This data may be analyzed in real time on the client and protection applied locally in case data has breached the layers 502 and 504. An example of such data is a virus brought in on a portable flash drive.

Figure 6:
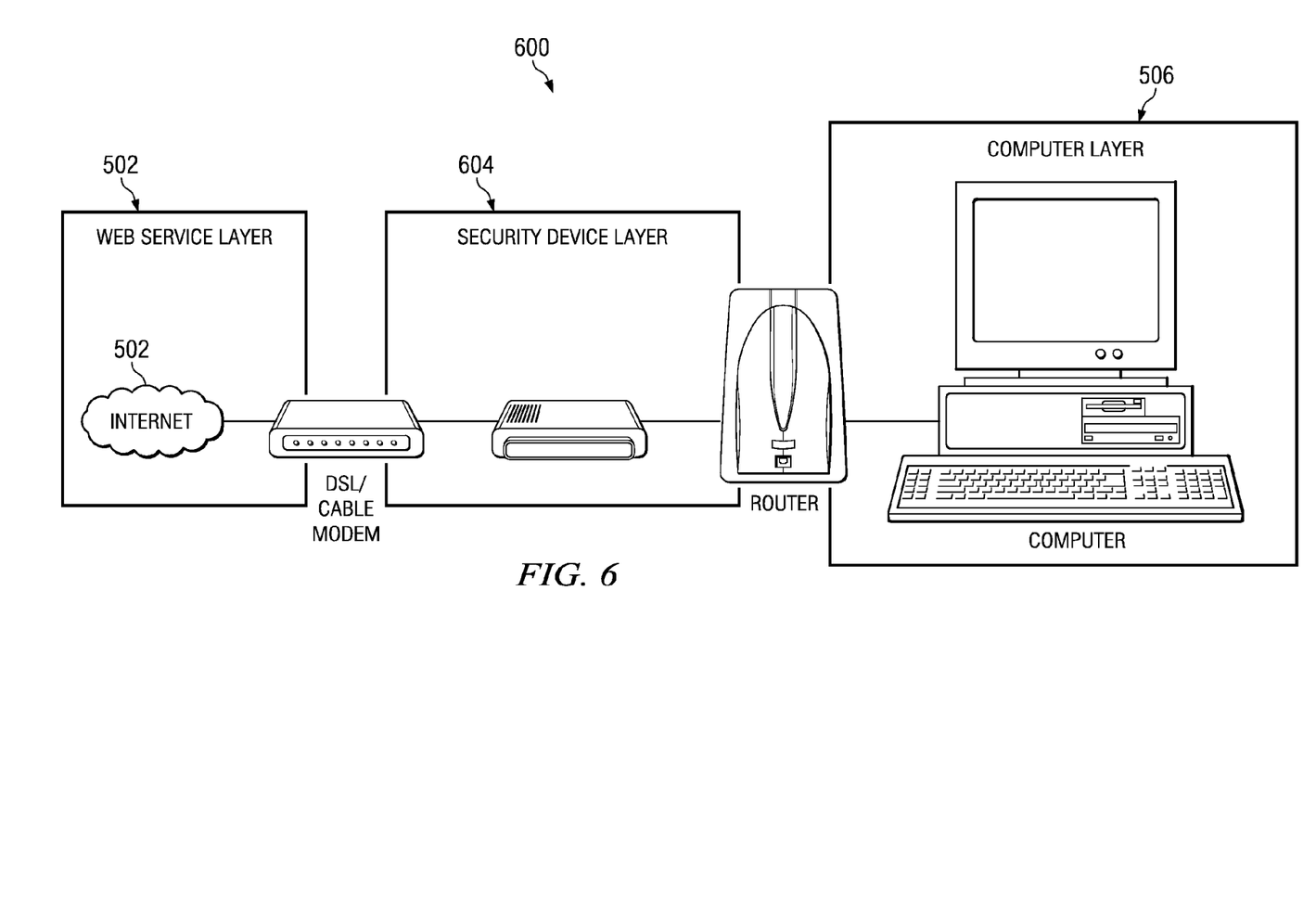
FIG. 6 illustrates another three-layer protection architecture in accordance with principles of the invention.

FIG. 6 illustrates another three-layer protection architecture in accordance with principles of the invention. In FIG. 6, an architecture 600 includes the web service layer 502, a security-device layer 604, and the computer layer 506. The security-device layer 604 differs from the device layer 504 in that a separate security device (e.g., the security device 112) is located between a cable/DSL modem (e.g., the cable/DSL modem 111) and a router (e.g., the gateway-router 114), as opposed to the device layer 504, in which all device-layer functionality is resident upon the router illustrated in the architecture 500. The architecture 600 is adapted to be used by users who already have a legacy router and do not want to upgrade to a new router that includes device-layer functionality. However, protection provided by the security-device layer 604 is, in a typical embodiment, identical to that provided by the device layer 504.

In a typical embodiment, security services provided through the three layers (e.g., 502, 504 or 604, and 506) include: 1) parental controls; 2) a pop-up blocker; 3) a Spam blocker; 4) virus protection; 5) spyware protection; 6) identity protection; 7) firewall protection; and 8) network reporting.

A content-filtering database protects clients from inappropriate content and web sites. An application control allows the user to define software usage (e.g., instant messaging) and control which applications are downloaded to the client. Unwanted pop-up windows are blocked while approved pop-up windows are permitted. This feature may be customized as needed via additions to the pop-up control database. Clients (e.g., files, e-mail, downloads, and overall network) are automatically protected, for example, from viruses, malicious internet worms, and backdoor Trojan attacks.

The Spam blocker feature blocks unwanted e-mail and provides anti-phishing protection at the same time. In some embodiments, protection may be plugged directly into Microsoft® Outlook® or other e-mail applications and across all e-mail accounts without changing addresses, forwarding mail, or giving out passwords. The spyware-protection feature provides protection against adware and spyware applications and against installation of such malicious software that can monitor browsing habits, seek out system information, or report private information to outside entities.

The identity-protection feature protects personal identification and financial information from malicious applications looking to expose information such as, for example, name, phone number, credit-card numbers, bank-account information, and other critical data. The firewall-protection feature protects client information and stops network application intrusions and hacker attempts. A phishing protection feature blocks e-mails attempting to obtain personal information. The network-reporting feature keeps track of client computers and internet usage by providing a detailed report that breaks down how long each user has spent on the client computer(s) when the users have been using the client computer(s).

It is thus believed that the operation and system of various embodiments of the present invention will be apparent from the foregoing description. It will be obvious that various changes and modifications may be made to the methods and systems described herein without departing from the spirit and scope of the invention.

What is claimed is:

1. A network-communication method comprising:
   detecting network activity between a router of a local area network and a wide area network, the local area network comprising a plurality of client devices;
   decoding the network activity;
   responsive to the decoding step, obtaining at least a source network address for the network activity, the source network address being a network-layer address of the router of the local area network;
   using the source network address to establish a transparent networking bridge between the local area network and the wide area network, the using step comprising assigning to the transparent networking bridge a network-layer address having a same range as the source network address;

wherein the transparent networking bridge establishes a connection with at least one server located on the wide area network;

wherein the transparent networking bridge is unknown to the plurality of client devices on the local area network;

wherein the transparent networking bridge has no network-layer address or device address specifically assigned thereto; and providing security services to the plurality of client devices on the local area network via the at least one server;

wherein the detected network activity is outbound network activity from the local area network to the wide area network;

wherein the obtaining step comprises obtaining a device address of a first gateway of the wide area network; and wherein the first gateway of the wide area network belongs to a network service provider providing access to the wide area network.

2. The network-communication method of claim 1, wherein the network-layer address is an Internet Protocol address and the device address is a Media Access Control address.

3. The network-communication method of claim 1, wherein the detected network activity comprises a DHCP offer packet.

4. The network-communication method of claim 1, wherein the detected network activity comprises a DHCP request packet.

5. The network-communication method of claim 1, further comprising:
creating a first DHCP packet; and
wherein the detected network activity comprises a second DHCP packet responsive to the first DHCP packet.

6. The network-communication method of claim 1, wherein the source network address is a network-layer address assigned to a wide area network connection of the router of the local area network.

7. The network-communication method of claim 1, further comprising communicating with an authentication server on the wide area network in order to determine if there is an existing account for providing security services to one or more of the plurality of client devices.

8. The network-communication method of claim 6, wherein, in communications initiated by the transparent networking bridge, the transparent networking bridge utilizes the device address of the first gateway of the wide area network as its device address and utilizes the network-layer address of the first gateway on the WAN as a new source address.

9. The network-communication method of claim 8, comprising:
responsive to a determination that an account has already been set up, receiving account policy information; and
responsive to a determination that an account has not been set up, creating an account.

10. The network-communication method of claim 1, comprising evaluating at least some inbound data in accordance with pre-defined criteria.

11. The network-communication method of claim 10, wherein the data includes information about a client, application, and user.

12. The network-communication method of claim 1, wherein the at least one server provides user-defined security services to the plurality of client devices from a wide area network side of the bridge.

13. The network-communication method of claim 1, comprising:
receiving a tagged data packet;
evaluating information in the tagged data packet;
responsive to the evaluating step, implementing a security measure.

14. The network-communication method of claim 1, further comprising performing real-time contextual analysis to identify threats relative to at least one of web content, Spam, virus, and malware.

15. A method comprising:
detecting network activity from a router of a local area network to a wide area network, the local area network comprising a plurality of client devices;
decoding the network activity;
responsive to the decoding step, obtaining a source network address for the network activity and a device address of a first gateway on the wide area network, the source network address being a network-layer address assigned to a wide-area-network connection of the router;
establishing a transparent networking bridge between the local area network and the wide area network, the establishing step comprising assigning to the transparent networking bridge a network-layer address having a same range as the source network address;
establishing a connection with at least one server on the wide area network;
via the transparent networking bridge, utilizing the connection with the at least one server to provide one or more network-based security services to the plurality of client devices;
wherein the transparent networking bridge is unknown to the plurality of client devices on the local area network; and
wherein the transparent networking bridge has no network-layer address or device address specifically assigned thereto.

16. The method of claim 15, wherein:
the at least one server comprises a remotely-hosted security control center, the remotely-hosted security control center comprising a plurality of servers; and
the utilizing step comprises utilizing a connection with selected ones of the plurality of servers to provide a plurality of network-based security services to the plurality of client devices.

* * * * *